J. W. McDANIEL.
GUM TRUCK.
APPLICATION FILED MAY 25, 1911.
1,020,509.
Patented Mar. 19, 1912.
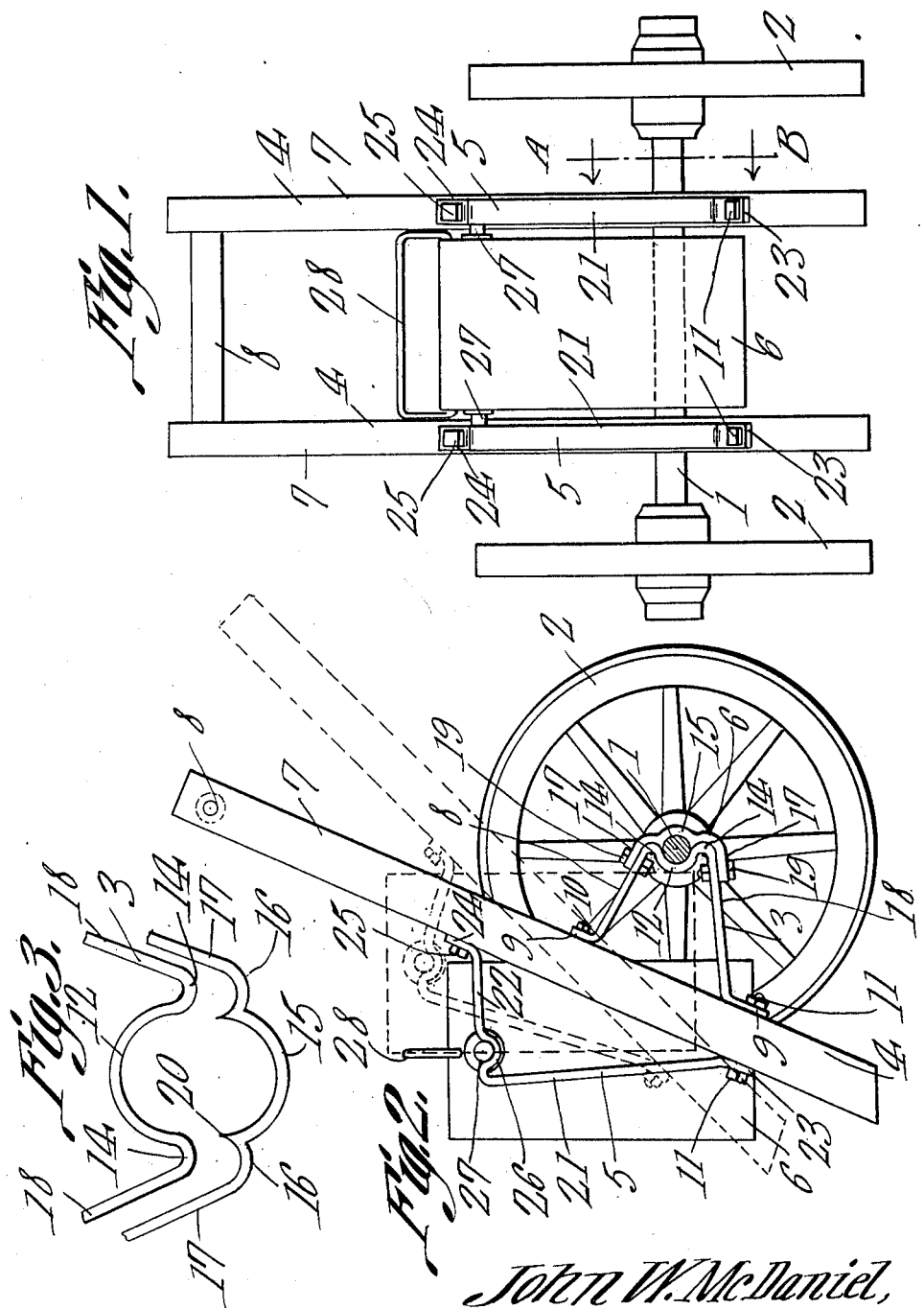
John W. McDaniel,
Inventor
Witnesses
by C. A. Snow & Co.
Attorneys

UNITED STATES PATENT OFFICE.

JOHN W. McDANIEL, OF HOLLEY, FLORIDA.

GUM-TRUCK.

1,020,509.  Specification of Letters Patent.  Patented Mar. 19, 1912.

Application filed May 15, 1911. Serial No. 629,411.

*To all whom it may concern:*

Be it known that I, JOHN W. McDANIEL, a citizen of the United States, residing at Holley, in the county of Santa Rosa and State of Florida, have invented a new and useful Gum-Truck, of which the following is a specification.

The device forming the subject matter of this application, is a transportation structure, adapted to be employed for collecting gum in the forest, the device being adapted to be employed in the manufacture of turpentine and the like.

The objects of the invention are to provide a truck of novel and improved form, to provide a novel form of receptacle, adapted to be used in connection with the truck, and so to construct the truck and the receptacle that the truck will constitute a means for holding the receptacle in convenient position to receive the material, the receptacle tilting, when the truck is tilted and wheeled about, so that the contents of the receptacle will not be spilled, during the wheeling of the truck.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in end elevation; Fig. 2 is a section upon the line A—B of Fig. 1, looking in the direction of the arrows; and Fig. 3 is an elevation of the bearing structure, the constituent portions thereof being spaced apart.

In carrying out the invention there is provided an axle 1, carrying wheels 2. Bearings 3 are carried by being mounted upon the axle 1, the bearings 3 carrying a frame 4, equipped with outstanding brackets 5, upon which is suspended a receptacle 6.

In a more detailed description, the frame 4 comprises straight side bars 7, connected adjacent their upper ends by a transverse handle bar 8. The bars 7 are of sufficient length to engage the ground in front of the wheels 2, and to extend in rearwardly inclined relation, across, and to the rear of the axle 1. The bearings are composite structures, each bearing consisting of an arched member, having laterally extended feet 9, secured to the rear faces of the bars 7 by means of bolts 10 and 11. The intermediate portion of the arched member is curved as shown in Fig. 2, toward the bar 7, as shown at 12, to provide a bearing for the axle 1, and to define projections 14, at the ends of the bearing portion 12. The bearing further includes a cap, having a centrally curved portion 15, coöperating with the portion 12 of the arched member, in engaging the axle 2. At the ends of the portion 15, the curved, seat-forming parts 16 are located, into which parts, the projections 14 are adapted to fit. The ends 17 of the seat-forming portions 16, are overlapped upon the arms 18 of the arched member, and are secured thereto by means of bolts 19 or the like. The extremities of the curved portion 15 of the cap are beveled, as shown at 20, so as to fit within the curved portion 12 of the arched member, the cap and the arched member thereby coöperating, in their portions 15 and 12, to form a circular bearing, adapted to receive the axle 1.

To the forward edges of the bars 7, supporting brackets are secured. The supporting brackets are approximately rectangular in outline, and comprise a substantially vertical arm 21 and a substantially horizontal arm 22, the arm 21 being provided at its lower end with a foot 23, and the arm 22 being provided at its upper end with a foot 24. The foot 23 is bound upon the side bar 7 by the bolt 11. The foot 24 of the arm 22, is located above the bolt 10, and is secured to the arm 7, by a separate bolt 25. In the horizontal arms 22, relatively near to the outer ends of said arms, depressed seats 26 are formed. These seats 26 are adapted to receive trunnions 27 outstanding in oppositely disposed relation, from the receptacle 6, adjacent the upper end of the receptacle, the receptable being provided with a pivoted bail 28, extended across its upper edge.

In practical operation, the device may be positioned as shown in Fig. 2, the lower ends of the side bars 7 resting in contact with the ground, in advance of the axle 1, the bars 7 extending rearwardly across the axle 1. When the lower ends of the bars 7 are in contact with the ground, the arms 22 of the brackets will be disposed in substantially horizontal positions, the trunnions 27 of the receptacle 6 resting in the seats 26, and the receptacle 6 being thus pivotally supported between the brackets. The receptacle is of sufficiently small diameter so that when the receptacle is suspended, as shown in solid line in Fig. 2, a space will exist between the rear edge of the receptacle 6 and the axle 1. When it is desired to move the device about from place to place, the frame comprising the side bars 7, may be swung rearwardly, into the dotted line position shown in Fig. 2, the receptacle 6 pivoting upon its suspending elements 26—27, and maintaining a vertical position, while the truck is being wheeled about.

The device is of simple construction and of few parts, and is well adapted for use in the forest and elsewhere, where a strong structure, well suited to withstand hard usage, is required.

Having thus described the invention, what is claimed is:—

A device of the class described comprising a wheel-mounted axle; bearings mounted upon the axle; a frame comprising straight bars to which the bearings are secured, the bars being of sufficient length to engage the ground in front of the wheels, and to extend in rearwardly inclined positions, across and to the rear of the axle; angle brackets secured to the forward edges of the bars, and having depressed seats in their upper edges, adjacent their outer ends, the seats being located above the axle, when the lower ends of the bars are in engagement with the ground; and a receptacle having oppositely disposed trunnions, adapted to rest in the seats, the receptacle being spaced from the axle, when the bars are in engagement with the ground, to permit a rearward tilting of the bars, without disturbing the vertical position of the receptacle.

In testimony that I claim the foregoing as my own, I have hereto affixed my signature in the presence of two witnesses.

JOHN W. McDANIEL.

Witnesses:
C. TALBERT,
D. Q. HURST.

Copies of this patent may be obtained for five cents each, by addressing the "Commissioner of Patents, Washington, D. C."